Figure 1:
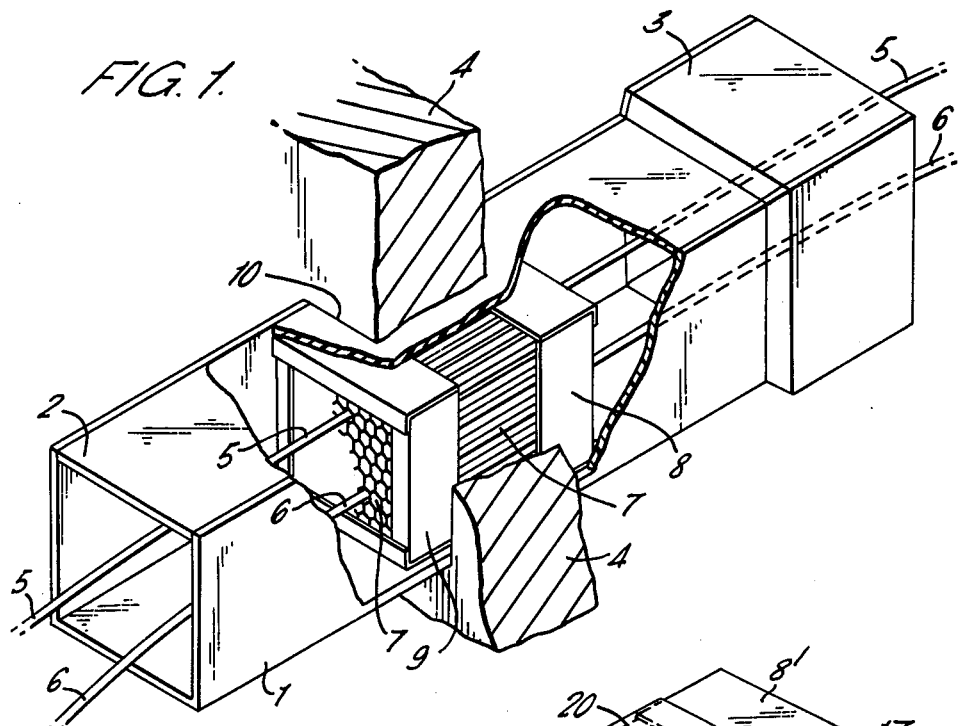

United States Patent [19]

Thwaites et al.

[11] 4,093,818

[45] June 6, 1978

[54] FIRE-PROTECTIVE CELLULAR SERVICE DUCTING

[75] Inventors: Peter John Thwaites, Eltisley; Dennis William Green, Stapleford, both of England

[73] Assignee: Dufaylite Developments Limited, England

[21] Appl. No.: 714,224

[22] Filed: Aug. 13, 1976

Related U.S. Application Data

[63] Continuation of Ser. No. 642,511, Dec. 19, 1975, abandoned.

[30] Foreign Application Priority Data

Dec. 20, 1974 United Kingdom ............... 55237/74

[51] Int. Cl.² .......................... H02G 3/22; A62C 3/16; E04B 1/94; F16L 5/00
[52] U.S. Cl. ....................................... 174/48; 52/232; 138/108; 169/48; 174/68 C; 174/99 R; 174/101; 248/56
[58] Field of Search ............. 174/48, 49, 68 R, 68 A, 174/68 B, 68 C, 95, 96, 97, 98, 99 R, 99 B, 100, 101; 52/1, 221, 232, 317; 138/103, 108, 111, 115; 169/46, 48, 49, 54; 248/56

[56] References Cited

U.S. PATENT DOCUMENTS

| 2,279,791 | 4/1942 | Lamb | 169/48 |
| 3,864,883 | 2/1975 | McMarlin | 174/48 X |
| 3,932,696 | 1/1976 | Fork et al. | 174/48 |

FOREIGN PATENT DOCUMENTS

| 684,522 | 4/1964 | Canada | 174/68 B |
| 2,254,182 | 7/1975 | France | 169/48 |
| 2,052,683 | 5/1972 | Germany | 169/48 |
| 2,154,841 | 5/1973 | Germany | 52/232 |
| 2,162,251 | 6/1973 | Germany | 52/232 |

*Primary Examiner*—Laramie E. Askin
*Attorney, Agent, or Firm*—William Anthony Drucker

[57] ABSTRACT

The invention provides an assembly for accommodating service lines which comprises a length of ducting, a block of structural cellular material which fills the internal cross section of the ducting over at least a part of the length of the ducting, said block having cell walls which define cells which extend in the length direction of the ducting and on the cell walls a coating of intumescent material expandable to close the cells under fire conditions. With the block positioned where the ducting passes through a fire-resistant wall, the spread of fire through the ducting is usefully opposed. Using thermoplastic ducting, which has heretofore been contraindicated, results superior to those obtainable with steel ducting are achieved.

9 Claims, 3 Drawing Figures

U.S. Patent

June 6, 1978

4,093,818

FIRE-PROTECTIVE CELLULAR SERVICE DUCTING

This is a continuation of application Ser. No. 642,511, filed Dec. 19, 1975, now abandoned.

The present invention relates to structural cellular materials.

It is important in building construction to form floorings and partition walls of materials having a good fire resistance so that the rate of spread of fire is minimised. Usually throughways must be provided between parts of a building to accommodate service lines such as electric power cables, telephone cables or pneumatic or hydraulic lines. Unless precautions are taken, such throughways can promote the spread of fire.

According to the present invention there is provided an assembly for accommodating service lines which comprises a length of cable ducting having its internal cross section filled over at least a part of its length with a block of structural cellular material the cell walls of which extend in the length direction of the ducting and are coated with an intumescent material which is expandable to close the cells under fire conditions.

When the ducting is fitted through an aperture in a wall with the block at the position of the wall, the spread of fire through the ducting is opposed by the intumescent material.

For best results and convenience, the structural cellular material is preferably a structural honeycomb material, conveniently a structural honeycomb material formed of paper as described in British patent specification No. 591,772. The size of the cells should be small enough to be readily closed by expansion of the intumescent material, e.g. ⅜ inch (10 mm). For best results the thickness of the material should be large compared with the cell size.

The ducting is preferably formed of a material of low-conductivity, e.g. of thermoplastic material. Thermoplastic ducting is cheaply produced by extrusion and is readily available. Heretofore thermoplastic ducting has not been acceptable for installation through a fire barrier wall or floor owing to its rapid failure on exposure to heat. However, when employed in accordance with the present invention it tends to be superior to the steel ducting previously prescribed. Steel ducting has a high thermal conductivity which is unsatisfactory. With the present arrangement, the heat-expanded intumescent material provides a barrier against both thermal conduction and gaseous flow after failure of the ducting.

It has been a practice to fit fire-resistant materials, e.g. asbestos or fireclay, in ducting where it passes through a fire barrier. The efficacy of this arrangement depends very much on the care taken in the original fitting and on occasions when cables or other service lines are added or replaced. Fitting the material of the present invention with the service lines running through the cells is a simple matter and, as the cells do not close until fire conditions occur, the addition or replacement of service lines is a simple matter requiring no cutting away of material or replacement or re-filling after insertion of the new service line.

Except when a low standard can be accepted, or a steel ducting tolerated, the block of cellular material should be mechanically supported, independently of support by the ducting. A preferred arrangement is to provide the block, at each end thereof, with a metal end frame, said end frames being spaced apart from one another to define a thermal conduction restricting gap. The end frames can be held in place prior to fitting the block in the ducting by an adhesive, or more conveniently, by a surrounding band, e.g. of non-inflammable material, adhesively secured in lapping relationship with the flames. For best results, the end faces of the block may be provided with supporting grids of metallic mesh secured to the frames.

Conveniently, the ducting is of the lidded type and the block is insertable into the ducting with the lidding open. Forms of lidded thermoplastic ducting are available which will readily admit the block when open, usually with some deformation of the walls during insertion.

Figure 2:
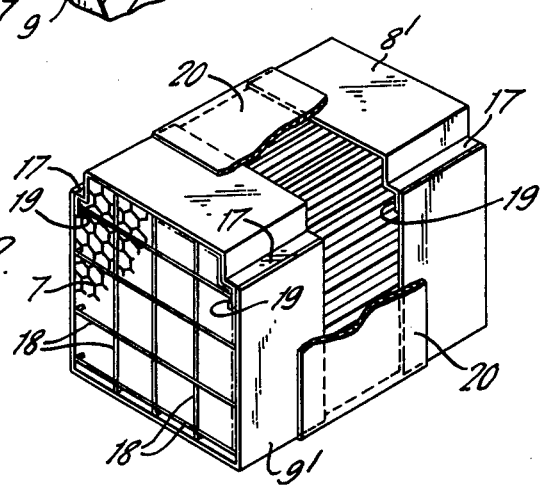
Figure 3:
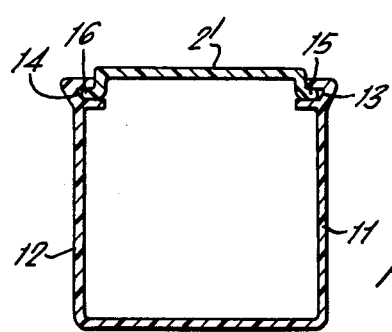

The following description, in which reference is made to the accompanying drawing, is given in order to illustrate the invention in its said first principal aspect. In the drawings:

FIG. 1 shows an assembly according to the invention passing through a wall, parts of the assembly and the wall being shown broken-away for simplicity of illustration, FIG. 2 shows a modified form of block, and FIG. 3 is a cross section of a ducting used in conjunction with a block according to FIG. 2.

In FIG. 1, a length of polyvinyl chloride ducting 1 having a removable cover 2 and an enlarged end portion 3 for the reception of a further length of ducting is shown fitted through a wall 4. The wall 4 and ducting 1 are both shown partly broken away for simplicity of illustration.

A number of cables, of which two only (5 and 6) are shown, pass through a block 7 of intumescent-coated structural honeycomb material formed from paper or cardboard and preferably stabilised in the expanded state by impregnation with a thermosetting resin. To maintain integrity on softening or combustion of the ducting, the block is held by two flanged metal end frames 8 and 9. A gap between the two frames prevents the transfer of heat by conduction through the metal. It is preferred that this gap is substantially less than the thickness of the wall and that at least a part of the thickness of each frame is positioned within the aperture 10 of the wall.

The frames advantageously have a loose peripheral fit around the blocks so that distortion of the frames does not damage the block in its friable state when carbonised.

The frames may be dispensed with if maximum effect is not required or if the ducting is formed of ceramic or other material of good fire resistance.

Simple installation is obtained by passing the cables through the cells with cover 2 removed, applying the cover, and sliding the assembly along over the cables.

The block shown in FIG. 2 has end-frames 8' and 9', fabricated from steel strip, and shaped as shown to fill the internal cross-section of the ducting shown in FIG. 3, which is of a favoured, commercially available type. This ducting has, at the top edges of its side-walls 11 and 12, integral formations providing inwardly directed grooves 13 and 14 for engagement with the outwardly directed extremities 15 and 16 of removable cover 2'. Cover 2' is fitted from above whilst springing one or both of the side walls 11 and 12 outwardly. The shape of the end frames 8' and 9' provides shoulders 17 which fit under the formations providing the grooves 13 and 14, and above the shoulders a part of reduced width which fits under the cover 2'.

The block of FIG. 2 has a close peripheral fit with the ducting and its cover 2' and is insertable from above before the lid is fitted.

The end frames 8' and 9' are identical. Their outer faces are provided with horizontal and vertical sets of steel wires 18 secured in position to form a square mesh structure by welding their end portions, which are bent in at right angles to the inner faces of the strips forming the frames. These mesh structures support the block 7 of intumescent-coated structural honeycomb material when the coating expands and carbonises under fire conditions. They are superior to flanges on the frames (FIG. 1) in that they provide less obstruction for the fitting of service lines such as cables 5 and 6.

A strip of adhesive-coated non-inflammable material 20 secures the frames in position.

Forming the frames as shown by fitting a top portion providing shoulders 17, and having ends 19, within the tops of the separately formed side portions gives a lapped construction together with the peripheral fit aforesaid.

We claim:

1. An assembly, for accommodating service lines, which comprises a length of ducting, a pair of metal frames each having a peripheral fit with the interior of the ducting, said frames being spaced apart in the length direction of the ducting to define a thermal conduction restricting gap between the frames, a block of structural cellular material so shaped, dimensioned and positioned as to have ends which engage within the frames and to extend from within one frame and across the position of the gap to within the other frame, said material having cell walls which define cells extending in the length direction of the ducting and permitting service lines to be passed through the block in said direction, and an intumescent material coated on said walls and being expandable to close said cells under fire conditions.

2. An assembly, for accommodating service lines, as claimed in claim 1, in which the frames are provided with grids of metallic material in supporting relationship with the ends of the block.

3. An assembly, for accommodating service lines, as claimed in claim 1, in which the block and the frames are secured together for insertion in the ducting as a sub-assembly.

4. An assembly, for accommodating service lines, as claimed in claim 1, wherein the structural cellular material is structural honeycomb material.

5. An assembly, for accommodating service lines, as claimed in claim 1, wherein the ducting is formed of a thermoplastic material.

6. An assembly, for accommodating service lines, which comprises a length of ducting, a block of structural cellular material which fills the internal cross section of the ducting over at least a part of the length of the ducting, said block having cell walls which define cells which extend in the length direction of the ducting, a coating on the cell walls of an intumescent material expandable to close the cells under fire conditions, and a respective metal end frame at each end of said block, said end frames being spaced apart from one another to define a thermal conduction restricting gap therebetween.

7. An assembly, for accommodating service lines, which comprises a length of ducting, a block of structural cellular material which fills the internal cross section of the ducting over at least a part of the length of the ducting and which has end faces, said block cell walls which define cells which extend in the length direction of the ducting, on the cell walls a coating of an intumescent material expandable to close the cells under fire conditions, and a respective supporting grid formed of metallic mesh at each end face of the block.

8. In an arrangement wherein service lines pass through an aperture formed in a fire-resistant wall, a length of ducting fitted through the aperture, a pair of metal frames each having a peripheral fit within the interior of the ducting, said frames being spaced apart in the length direction of the ducting to define a thermal conduction restricting gap between the frames, a block of structural cellular material fitted within the ducting and being so shaped, dimensioned and positioned as to have ends which engage within the frames and to extend from within one frame and across the position of the gap to within the other frame, said block having cell walls which define cells extending in the length direction of the ducting and permitting service lines to be passed through the block in said direction, said block being positioned such that at least a part thereof coincides with said fire-resistant wall, cells of said block having said service lines passed therethrough, and an intumescent material coated upon said cell walls and being expandable to close the cells under fire conditions.

9. An arrangement, according to claim 8, in which the block has a pair of metallic end-supporting members each of which is so positioned that at least a part thereof is surrounded by said wall.

* * * * *